United States Patent
Erickson

(10) Patent No.: US 6,412,291 B1
(45) Date of Patent: Jul. 2, 2002

(54) AIR COMPRESSION IMPROVEMENT

(76) Inventor: Donald C. Erickson, 1704 S. Harbor La., Annapolis, MD (US) 21401

( * ) Notice: Subject to any disclaimer, the term of this patent is extended or adjusted under 35 U.S.C. 154(b) by 0 days.

(21) Appl. No.: 09/654,406

(22) Filed: Sep. 5, 2000

(51) Int. Cl.$^7$ ................................................. F25D 9/00
(52) U.S. Cl. ............................... 62/87; 60/728; 62/402; 62/285
(58) Field of Search .................... 62/86, 87, 88, 62/401, 402, 285; 60/728

(56) References Cited

U.S. PATENT DOCUMENTS

| | | | | |
|---|---|---|---|---|
| 3,877,218 A | * | 4/1975 | Nebgen | 60/39.05 |
| 5,444,971 A | * | 8/1995 | Holeberger | 60/728 |
| 5,632,148 A | * | 5/1997 | Bronicki et al. | 60/728 |
| 5,699,673 A | * | 12/1997 | Hoshino et al. | 62/93 |
| 6,178,735 B1 | * | 1/2001 | Frutschi | 60/39.02 |

OTHER PUBLICATIONS

Malewski, Werner F., Holldorff, Gunther, "Power Increase of Gas Turbines by Inlet Air Pre–Cooling with Absorption Refrigeration Utilizing Exhaust Waste Heat." Asme International Gas Turbine Conference and Exhibit, Jun. 8–12, 1986, ASME NY, NY.

Meher–Homji, Cyrus B., Mee, Thomas R., III, "Inlet Fogging of Gas Turbine Engines Part A: Theory, Psychrometrics and Fog Generation," Proceedings of ASME Turbo Expo 2000, May 8–11, Munich, Paper No: 2000–GT–308.

Meher–Homji, Cyrus, B., Mee, Thomas R., III, Inlet Fogging of Gas Turbine Engines, Part B: Practical Considerations, Control, and O&M Aspects, Proceedings of ASME Turbo Expo 2000, May 8–11, Munich, Paper No: 2000–GT–308.

Nagib, M. M., "Analysis of a Combined Gas Turbine and Absorption–Refrigerated Cycle," Journal of Engineering for Power, Jan. 1971, pp. 28–32.

* cited by examiner

Primary Examiner—Ronald Capossela

(57) ABSTRACT

The efficiency and capacity of an air compressor (10) (FIG. 1) are increased by pre-cooling the inlet air to below the dew point in air chiller (11), and then injecting the resulting condensate into the chilled air in the form of fog-sized droplets in a fogger (16). The advantages extend to combustion engines, and especially to regenerative combustion turbines.

20 Claims, 1 Drawing Sheet

AIR COMPRESSION IMPROVEMENT

CROSS-REFERENCE TO RELATED APPLICATIONS

Not applicable.

STATEMENT REGARDING THE FEDERALLY SPONSORED RESEARCH OR DEVELOPMENT

Not applicable.

REFERENCE TO A MICROFICHE APPENDIX

Not applicable.

BACKGROUND OF THE INVENTION

All types of air compressors share an ambient temperature sensitivity—both the capacity and the efficiency decrease as the ambient temperature increases. The compressor-specific power demand is approximately proportional to the absolute temperature, which makes the efficiency proportional to the inverse absolute temperature. The compressor capacity is proportional to the density of the inlet air.

These sensitivities become particularly pronounced in combustion engines, in which the compressed air is used to combust a fuel and ultimately produce power. Both the power output and engine efficiency are de-rated at warm ambients. The degradation is not so severe with reciprocating engines, which require little more than stoichiometric air. The degradation is very severe with combustion turbines, which require on the order of 3 or 4 times stoichiometric air.

One known method of counteracting the warm ambient degradation of air compressors is by cooling the inlet air, either evaporatively or with a refrigerant. The refrigerated cooling can be done either in refrigerated air coils or by direct contact with sprayed chilled water. The refrigeration is supplied by either mechanical or absorption refrigeration systems, and in some instances through a cold storage medium (ice or chilled water).

Another approach to cooling inlet air is by over-spraying, typically via fogging. Sufficient water is injected into the air in fine droplet form such that it not only reduces the temperature adiabatically to the dew point, but additional droplets remain un-evaporated, and carry into the compressor suction. Those droplets rapidly evaporate as compression proceeds, slowing the temperature Increase caused by compression, and hence effectively adding to the amount of inlet cooling. For the droplets to remain suspended in the air into the suction rather than separate out excessively, they should be in the fog-size range, i. e., less than 40 microns in diameter and preferably 5 to 20 microns, Another advantage of this size range is that the droplets are small enough that they do not erode the compressor blades.

The problems with the current approaches to cooling compressor inlet air include the following. Most compressors would benefit thermodynamically from sub-freezing inlet temperatures, or at least could be designed to benefit from those temperatures. However, there are many practical difficulties. Especially with high rotational speed combustion turbines, there is a possibility of ice buildup on inlet guide vanes, which then could spall off and damage the compressor blades. This imposes a practical limiting temperature of about 4° C. for many inlet cooling systems. Cooling below that temperature will require some additional technique of reducing the humidity level of the cold air below saturation—reheat, etc. On the refrigeration side, special measures are also required to deal with the $H_2O$ removal from the air in sub-freezing conditions: periodic defrosting of the air coils, or continuous addition of a melting agent. Furthermore, the refrigeration system requires proportionately more input power to reach the lower temperatures—more shaft power for mechanical refrigeration, or higher quality heat for absorption refrigeration. With mechanical refrigeration, the power necessary to reach sub-freezing temperatures is so large, and the marginal improvement in compression is so small, that there is little or no net gain from cooling to sub-freezing temperatures.

Even when the inlet cooling is restricted to above-freezing temperatures, another major problem remains. The compressor benefit is substantially due to the sensible cooling of the inlet air, with almost no added benefit from the latent cooling, i.e., the amount of moisture condensed out of the air. However, the latent cooling typically represents 25 to 50% of the total refrigeration load. For example, consider 35° C. air at 50% relative humidity, which is cooled to 5° C. at 100% relative humidity. The moisture content decreased from 1.8 weight percent to 0.55 weight percent. For these conditions, only 51% of the total refrigeration provides sensible cooling, and 49% causes the water condensation. Thus, much of the refrigeration is effectively wasted.

The overspray or fogging approach to inlet cooling also presents problems. The two foremost are that the cooling is adiabatic, as opposed to the diabatic cooling of the refrigeration approach; and that a source of pure water is required for every bit of cooling accomplished. The adiabatic limitation causes the inlet sensible temperature to be no lower than the dew point. The cost and availability of pure water mitigate against this approach at many sites.

What is needed, and included among the objects of this invention, are apparatus and process which overcome the prior art problems cited above, i. e., an inlet cooling system wherein the latent load contributes to effective cooling in addition to the sensible load contribution; where the benefits of the overspray approach are available without the limitations of needing a large source of pure water and that the inlet temperature is limited to the dew point; where the thermodynamic benefits of sub-freezing inlet temperatures are achievable without the practical problems; and wherein the refrigeration system is activated by low temperature waste heat so as not to detract from the compressor shaft power reduction provided by the inlet cooling system.

DISCLOSURE OF THE INVENTION

The above advantages are obtained in a process for compressing air comprising: chilling air to between the dew point and the frost point; collecting the resulting condensate; injecting the condensate into the chilled air in the form of very small droplets; and compressing the chilled droplet laden air. They are also obtained in an apparatus for increasing the capacity and efficiency of an air compressor comprising: a means for air chilling which is supplied with a refrigerant; a condensate collection system for condensate condensed from said air by said means for chilling; a means for converting said condensate into fog-sized droplets; a means for injecting said droplets into said air downstream of said chilling means; and a duct for supplying said chilled and fogged air to the suction of said air compressor.

DETAILED DESCRIPTION OF THE INVENTION

Figure 1:
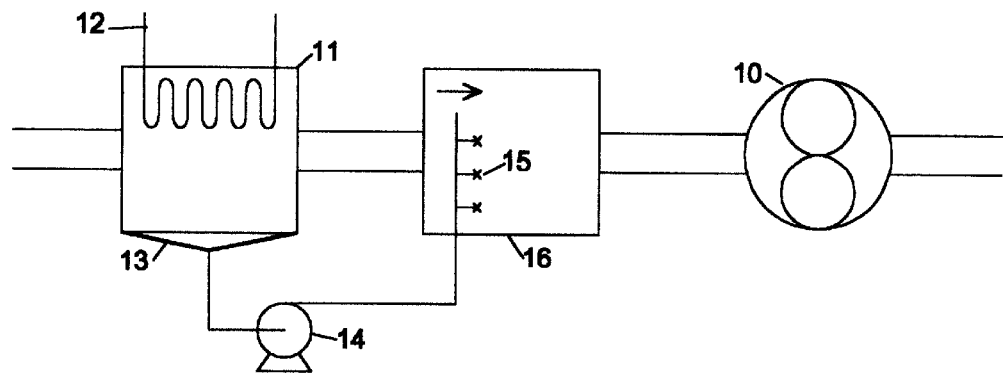
FIG. 1 illustrates the three essential features of the invention: an air chilling system including means for condensate collection; an overspray system; and an air compressor.

Referring to FIG. 1, inlet air for air compressor 10 is first supplied to air chiller 11, where it is cooled to below the dew point by cooling coil 12. The condensate is collected in collection pan 13, then pressurized to between 6 and 20 MPa in pump 14, and routed to fogging nozzles 15 of overspray system 16. From there, the chilled, saturated, oversprayed air is routed to the suction of compressor 10. There may also be a spray water reservoir, filter, makeup source, and deionizing bed, to help ensure continuity and purity of the spray.

Figure 2:
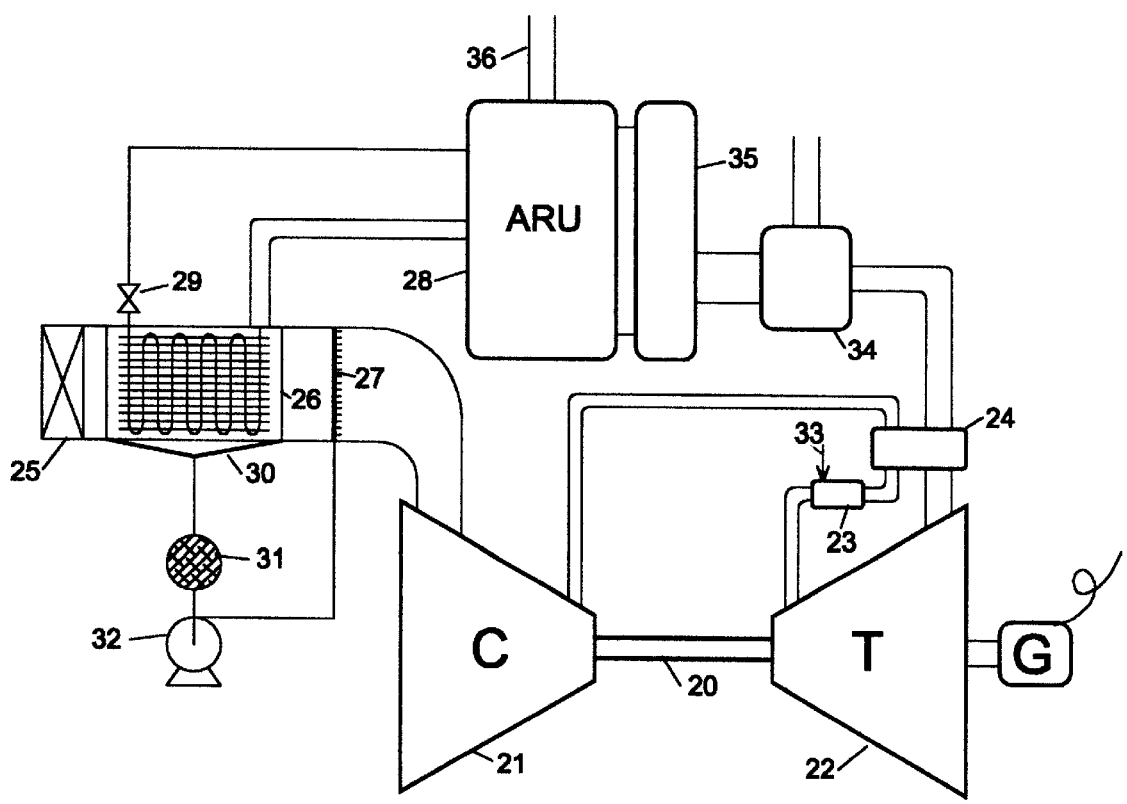
FIG. 2 shows a more complex application of the invention wherein the compressor is part of a combustion engine, and the engine waste heat powers absorption refrigeration unit (ARU) which in turn supplies chilling to the air chiller.

Referring to FIG. 2, combustion turbine 20 is comprised of compressor 21, turbine 22, combustor 23, and regenerator 24. Inlet air for compressor 21 is filtered in filter 25, chilled to below the dew point in refrigerated air coil 26, and then fogged by spray nozzles 27. Liquid refrigerant is supplied to air coil 26 from ARU 28 via pressure letdown valve 29, and refrigerant vapor is returned to the ARU. Moisture condensed from the air is collected in collector 30, filtered and purified in filter-purifier 31, and pressurized in pump 32, then routed to the fogging nozzles 27. The heat of compression in compressor 21 evaporates all the fog droplets, and compressed air exits the compressor with the benefits of both sensible and latent cooling, and at a correspondingly lower temperature. The maximum thermodynamic benefit is obtained when the cooler compressed air is supplied to regenerator 24, as shown, although substantial benefit is also obtained without a regenerator. Fuel 33 is combusted with the compressed air in combustor 23, and the hot pressurized combustion gas is expanded in turbine 22 to produce shaft power. The hot exhaust may be routed through regenerator 24, diverter valve 34, heat recovery steam generator 35, and finally ARU 28, before exhausting to atmosphere through stack 36.

With the FIG. 2 flowsheet, and assuming the operating conditions cited above (35° C., 50% relative humidity ambient, chilled to 5° C.) the following benefits are achieved. The inlet air is sensibly cooled by 30° C., plus additional overspray cooling internal to the compressor of virtually the same amount (60° C. cooling altogether). The turbine shaft power output increases by at least about 30%, and the efficiency increases by 5 to 20%, dependent upon the pressure ratio and whether or not regeneration is present. The maximum efficiency increase is obtained with regeneration, and with the lower pressure ratio machines such as microturbine. Even with large combined cycle plants, an appreciable overall plant efficiency gain is realized, in addition to the major gain in capacity. The large amount of effective inlet cooling is achieved without the problems of sub-freezing conditions, and without need for a separate source of pure water for the fogging system. Since waste heat powers the absorption system there is almost no parasitic power offset to the increased capability.

The $NH_3$—$H_2O$ type of ARU adapts well to being directly heated by low temperature exhaust, e.g., 175° C. or lower, and also to direct expansion chilling coils. However, LiBr ARUs may also be used, and need not be directly integrated, i.e., can use steam or hot water heating and chill water cooling circuit. The air cooling to below the dew point can be via direct contact, e.g., with a spray of recirculating chilled water, rather than via coils. With coils, more than one evaporation temperature can profitably be used.

The $NH_3$—$H_2O$ ARU can also be used to make ice, e.g., for thermal storage cooling of a peaking or variably loaded plant. With a combustion engine, the 60° C. cooling cited above can be driven by as little as 100° C. cooling of the exhaust, e.g., from 175° C. to 75° C. For some applications it will be desirable to further refrigerate the inlet air to below freezing before fogging, and/or to do interstage fogging in lieu of inlet fogging. Compressed air supply systems will also benefit from this disclosure, plus also other types of combustion engines, such as reciprocating types.

Standard means of generating fog-sized droplets are contemplated, including the techniques described in the enclosed references. The refrigeration for chilling can be from mechanical compression systems in lieu of by absorption.

What is claimed is:

1. A process for compressing air comprising:
   chilling air to between the dew point and the frost point;
   collecting the resulting condensate;
   injecting the condensate into the chilled air in the form of very small droplets; and
   compressing the chilled droplet laden air.

2. The process according to claim 1 wherein said droplets are predominantly in the size range of 5 to 40 microns—normally referred to as fog.

3. The process according to claim 2 wherein said chilling is to a temperature below about 5° C.

4. The process according to claim 2 additionally comprising combusting a fuel with said compressed air; and work expanding the resulting hot compressed combustion products.

5. The process according to claim 2 additionally comprising supplying said chilling by an absorption refrigeration unit (ARU).

6. The process according to claim 5 additionally comprising combusting a fuel with said air and work expanding the resulting hot combustion products; and supplying heat to said ARU from said work expander exhaust.

7. The process according to claim 6 wherein said ARU is an ammonia-absorption type, and additionally comprising supplying ARU ammonia refrigerant directly to an air coil for said chilling step; and providing exhaust heating directly to the ARU absorbent.

8. The process according to claim 2 additionally comprising partially compressing said chilled air prior to injecting said fog droplets.

9. The process according to claim 2 additionally comprising refrigerating said chilled air to below the frost point before injecting fog.

10. An apparatus for increasing the capacity and efficiency of an air compressor comprising:
    a means for air chilling which is supplied with a refrigerant;
    a condensate collection system for condensate condensed from said air by said means for chilling;
    a means for converting said condensate into fog-sized droplets;
    a means for injecting said droplets into said air downstream of said chilling means; and
    a duct for supplying said chilled and fogged air to the suction of said air compressor.

11. The apparatus according to claim 10 wherein said means for air chilling is comprised of refrigerated air coils.

12. The apparatus according to claim 11 additionally comprised of an ARU which supplies refrigerant directly to said air coils.

13. The apparatus according to claim 12 wherein said ARU is comprised of $NH_3$—$H_2O$ working fluid, and a heat exchanger between said working fluid and a combustion exhaust gas.

14. The apparatus according to claim 13 wherein said combustion exhaust gas is from a combustion engine which is supplied by said air compressor.

15. The apparatus according to claim 14 wherein said combustion engine is a reciprocating engine.

16. The apparatus according to claim 14 wherein said combustion engine is a combustion turbine.

17. The apparatus according to claim 16 wherein said combustion turbine includes a regenerator.

18. The apparatus according to claim 10 additionally comprised of a LiBr ARU which supplies said chilling.

19. An apparatus for increasing the efficiency of a combustion turbine comprising:

a) a combustion turbine and a chiller for the inlet air for the combustion turbine which chills said air to below the dew point;

b) a collector for condensate from said chiller; and c) a system for injecting said condensate into said chilled air in the form of fog-sized droplets.

20. The apparatus according to claim 19 additionally comprised of an ARU which supplies cooling to said chiller and which is supplied waste heat from said combustion turbine exhaust; and at least one of:

a) a heat recovery steam generator which is supplied waste heat from said combustion turbine exhaust; and b) a regenerator which exchanges heat from said combustion turbine exhaust to said air.

* * * * *